(12) United States Patent
Yang (10) Patent No.: US 12,541,107 B2
(45) Date of Patent: Feb. 3, 2026

(54) OPTICAL WAVEGUIDE AND NEAR-EYE DISPLAY DEVICE

(71) Applicant: HONOR DEVICE CO., LTD., Shenzhen (CN)

(72) Inventor: Hanning Yang, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 340 days.

(21) Appl. No.: 18/265,310

(22) PCT Filed: Dec. 16, 2022

(86) PCT No.: PCT/CN2022/139700
§ 371 (c)(1),
(2) Date: Jun. 5, 2023

(87) PCT Pub. No.: WO2023/160159
PCT Pub. Date: Aug. 31, 2023

(65) Prior Publication Data
US 2025/0004272 A1    Jan. 2, 2025

(30) Foreign Application Priority Data
Feb. 28, 2022    (CN) .......................... 202210186270.0

(51) Int. Cl.
*G02B 27/01* (2006.01)
*G02B 6/34* (2006.01)

(52) U.S. Cl.
CPC ........... *G02B 27/0172* (2013.01); *G02B 6/34* (2013.01)

(58) Field of Classification Search
CPC .. G02B 27/0172; G02B 6/34; G02B 27/0081; G02B 2027/0136; G02B 2027/0174;
(Continued)

(56) References Cited

U.S. PATENT DOCUMENTS 10,859,768 B2    12/2020    Popovich et al.
2016/0231570 A1    8/2016    Levola et al.
(Continued)

FOREIGN PATENT DOCUMENTS

CN    108919493 A    11/2018
CN    111158149 A    5/2020
(Continued)

*Primary Examiner* — Mariam Qureshi
(74) *Attorney, Agent, or Firm* — WOMBLE BOND DICKINSON (US) LLP (57) ABSTRACT

Embodiments of this application relate to the field of display technologies, and provide an optical waveguide and a near-eye display device. The optical waveguide includes a first lens, a second lens, a connecting portion that connects the first lens and the second lens, an in-coupling grating, a first out-coupling grating, and a second out-coupling grating. The in-coupling grating is located on the connecting portion, and is configured to couple incident light to the optical waveguide. After the incident light is diffracted through the in-coupling grating, first diffractive light transmitted in the first lens and second diffractive light transmitted in the second lens are formed. The first out-coupling grating is located on the first lens and is configured to couple the first diffractive light out of the first lens.

20 Claims, 5 Drawing Sheets

(58) Field of Classification Search
CPC .... G02B 6/0016; G02B 6/0026; G02B 6/005; G02B 27/0101
See application file for complete search history.

(56) References Cited

U.S. PATENT DOCUMENTS

| | | | |
|---|---|---|---|
| 2016/0234485 A1* | 8/2016 | Robbins | H04N 13/332 |
| 2023/0333301 A1* | 10/2023 | Song | G02B 27/0081 |
| 2023/0377292 A1* | 11/2023 | Zheng | G06T 19/006 |
| 2024/0385449 A1* | 11/2024 | Guan | G02B 27/01 |

FOREIGN PATENT DOCUMENTS

| | | |
|---|---|---|
| CN | 111830715 A | 10/2020 |
| CN | 112731659 A | 4/2021 |
| CN | 112817150 A | 5/2021 |
| CN | 113093383 A | 7/2021 |
| CN | 113176672 A | 7/2021 |
| CN | 113325506 A | 8/2021 |
| CN | 113687512 A | 11/2021 |
| CN | 113970851 A | 1/2022 |
| WO | 2021218454 A1 | 11/2021 |

* cited by examiner

OPTICAL WAVEGUIDE AND NEAR-EYE DISPLAY DEVICE

CROSS-REFERENCE TO RELATED APPLICATIONS

This application is a national stage of International Application No. PCT/CN2022/139700 filed on Dec. 16, 2022, which claims priority to Chinese Patent Application No. 202210186270.0 filed on Feb. 28, 2022. The disclosures of both of the aforementioned application are hereby incorporated by reference in their entireties.

TECHNICAL FIELD

This application relates to the field of display technologies, and specifically, to an optical waveguide and a near-eye display device to which the optical waveguide is applied.

BACKGROUND

An existing near-eye display device that can implement binocular display usually includes two optical waveguides that are respectively responsible for binocular imaging. One display is disposed corresponding to each optical waveguide, and light emitted from each display can only propagate in a single optical waveguide. Consequently, the existing near-eye display device for binocular display requires two displays, causing that the existing near-eye display device for binocular display is heavy in weight, which is uncomfortable for a user to wear.

SUMMARY

According to a first aspect, this application provides an optical waveguide, including: a first lens, a second lens, and a connecting portion that connects the first lens and the second lens;
  an in-coupling grating, located on the connecting portion and configured to couple incident light to the optical waveguide, where after the incident light is diffracted by the in-coupling grating, first diffractive light transmitted in the first lens and second diffractive light transmitted in the second lens are formed;
  a first out-coupling grating, located on the first lens and configured to couple the first diffractive light out of the first lens; and
  a second out-coupling grating, located on the second lens and configured to couple the second diffractive light out of the second lens.

In the optical waveguide, the in-coupling grating can enable the incident light to be diffracted and then respectively propagate on the first lens and the second lens. When the optical waveguide is applied to a near-eye display device, only one display may be disposed in the near-eye display device corresponding to a location of the in-coupling grating, so that the first diffractive light and the second diffractive light that are formed through diffraction after light of the display is incident on the in-coupling grating are respectively transmitted on the first lens and the second lens, thereby implementing binocular display. In this way, a quantity of displays in the near-eye display device can be reduced, a weight of the near-eye display device can be reduced, and wearing comfort of a user can be improved.

In some embodiments, the first lens, the second lens, and the connecting portion are integrally formed on a same waveguide substrate. Compared with a manner in which the first lens, the second lens, and the connecting portion are separately processed and then connected by using glue or another mechanical structure, integrated molding can simplify a processing process, ensure consistency of optical planes of the first lens, the second lens, and the connecting portion, and increase a production yield.

In some embodiments, a thickness direction of the optical waveguide is a direction of a Z-axis, a straight line in which a line connecting geometric centers of the first lens and the second lens is located is a direction of an X-axis, and a direction perpendicular to both the Z-axis and the X-axis is a direction of a Y-axis; and the in-coupling grating is a one-dimensional diffraction grating, and the in-coupling grating includes a plurality of stripes parallel to the Y-axis. The in-coupling grating can diffract the incident light to generate diffractive light in two opposite directions, so that light separately transmitted in the first lens and the second lens can be generated by using one display.

In some embodiments, the optical waveguide further includes a first turn grating and a second turn grating. The first turn grating is located on the first lens and is configured to expand the first diffractive light, where the expanded first diffractive light is transmitted to the first out-coupling grating through the first lens. The second turn grating is located on the second lens and is configured to expand the second diffractive light, where the expanded second diffractive light is transmitted to the second out-coupling grating through the second lens. The first turn grating and the second turn grating are disposed to respectively expand the first diffractive light and the second diffractive light, so that a range of light transmission in the optical waveguide can be expanded, and a range of an effective eye movement frame can be increased.

In some embodiments, a shape of an outermost edge of a projection of the first turn grating on the first lens is a right triangle, one cathetus of the right triangle is closely adjacent to the in-coupling grating, a length of the cathetus is slightly greater than a length of the stripe of the in-coupling grating, and a hypotenuse of the right triangle faces the first out-coupling grating; and a shape of an outermost edge of a projection of the second turn grating on the second lens is another right triangle, one cathetus of the another right triangle is closely adjacent to the in-coupling grating, a length of the cathetus is slightly greater than the length of the stripe of the in-coupling grating, and a hypotenuse of the another right triangle faces the second out-coupling grating. The first turn grating and the second turn grating are disposed as right triangles, so that light diffracted from the in-coupling grating is maximally transmitted to the first turn grating and the second turn grating, and light diffracted from the first turn grating and the second turn grating is maximally transmitted to a human eye through the first out-coupling grating or the second out-coupling grating, thereby improving light utilization.

In some embodiments, both the first turn grating and the second turn grating are one-dimensional diffraction gratings, the first turn grating includes a plurality of stripes at a first angle to the X-axis, and the second turn grating includes a plurality of stripes at a second angle to the X-axis. Alternatively, all the stripes of the first turn grating and the stripes of the second turn grating are at specific angles to the stripes of the in-coupling grating. In this way, after the light diffracted from the in-coupling grating passes through the first turn grating and the second turn grating, optical paths can be turned, and transverse pupil expansion and longitudinal pupil expansion can be implemented.

In some embodiments, the first angle ranges from 1000 to 170°, and the second angle ranges from 1000 to 170°. When the first angle is greater than 1700 or less than 100°, a turning effect of the first turn grating on the incident light becomes poor, or basically no turning occurs. Therefore, the first angle ranges from 1000 to 170°, so that the first turn grating has a good turning effect on the light incident on the first turn grating. Similarly, when the second angle is greater than 170° or less than 100°, a turning effect of the second turn grating on the incident light becomes poor, or basically no turning occurs. Therefore, the second angle ranges from 1000 to 170°, so that the second turn grating has a good turning effect on the light incident on the second turn grating.

In some embodiments, the first lens is divided into a first upper out-coupling region and a first lower out-coupling region along a direction at an included angle 45° to the X-axis, and the first out-coupling grating includes a first upper sub-grating and a first lower sub-grating that are respectively located in the first upper out-coupling region and the first lower out-coupling region; the second lens is divided into a second upper out-coupling region and a second lower out-coupling region along a direction at an included angle 135° to the X-axis, and the second out-coupling grating includes a second upper sub-grating and a second lower sub-grating that are respectively located in the second upper out-coupling region and the second lower out-coupling region; and the first upper sub-grating, the first lower sub-grating, the second upper sub-grating, and the second lower sub-grating are all one-dimensional diffraction gratings, the first upper sub-grating and the second upper sub-grating each include a plurality of stripes parallel to the Y-axis, and the first lower sub-grating and the second lower sub-grating each include a plurality of stripes parallel to the X-axis. In other words, all the stripes of the first upper sub-grating and the stripes of the first lower sub-grating are at specific angles to the stripes of the first turn grating. All the stripes of the second upper sub-grating and the stripes of the second lower sub-grating are at specific angles to the stripes of the second turn grating. In this way, after light that is diffracted by the first turn grating and that propagates along a negative direction of the X-axis is totally reflected and propagates to the first upper out-coupling region in the first lens, the light is diffracted by the first upper sub-grating and then is coupled out of the optical waveguide, and is vertically emitted to the left eye of a person along a negative direction of the Z-axis. After light that is diffracted by the first turn grating and that propagates along a negative direction of the Y-axis is totally reflected and propagates to the first lower out-coupling region in the first lens, the light is diffracted by a first upper-lower grating and then is coupled out of the optical waveguide, and is vertically emitted to the left eye of the person along the negative direction of the Z-axis. After light that is diffracted by the second turn grating and that propagates along a positive direction of the X-axis is totally reflected and propagates to the second upper out-coupling region in the second lens, the light is diffracted by the second upper sub-grating and then is coupled out of the optical waveguide, and is vertically emitted to the right eye of the person along the negative direction of the Z-axis. After light that is diffracted by the second turn grating and that propagates along a negative direction of the Y-axis is totally reflected and propagates to the second lower out-coupling region in the second lens, the light is diffracted by the second lower sub-grating and then is coupled out of the optical waveguide, and is vertically emitted to the right eye of the person along the negative direction of the Z-axis.

In some embodiments, each stripe of the first upper sub-grating extends from an edge of the first lens along the direction of the Y-axis to a junction of the first upper out-coupling region and the first lower out-coupling region, and the first lower sub-grating extends from another edge of the first lens along the direction of the X-axis to the junction of the first upper out-coupling region and the first lower out-coupling region; and each stripe of the second upper sub-grating extends from an edge of the second lens along the direction of the Y-axis to a junction of the second upper out-coupling region and the second lower out-coupling region, and the second lower sub-grating extends from another edge of the second lens along the direction of the X-axis to the junction of the second upper out-coupling region and the second lower out-coupling region. In this way, the first upper sub-grating and the first lower sub-grating partially surround the first turn grating and fill most of a surface of the first lens, and the second upper sub-grating and the second lower sub-grating partially surround the second turn grating and fill most of a surface of the second lens, which facilitates implementing a large-area eye movement range.

In some embodiments, both the first turn grating and the second turn grating are two-dimensional diffraction gratings. Both the first turn grating and the second turn grating are formed by intersections of one-dimensional gratings parallel to the direction of the X-axis and parallel to the direction of the Y-axis. After the first diffractive light propagating to the optical waveguide irradiates a surface of the first turn grating, the first turn grating evenly diffracts the incident light to a region of the third quadrant formed by the negative direction of the X-axis and the negative direction of the Y-axis. Further, after the second diffractive light propagating to the optical waveguide irradiates a surface of the second turn grating, the second turn grating evenly diffracts the incident light to a region of the fourth quadrant formed by the positive direction of the X-axis and the negative direction of the Y-axis. The diffractive light continues to be totally reflected and propagate to the second out-coupling grating in the second lens, is diffracted by the second out-coupling grating and then is coupled out of the optical waveguide, and further is vertically emitted to the right eye of the person along the negative direction of the Z-axis.

In some embodiments, both the first out-coupling grating and the second out-coupling grating are one-dimensional diffraction gratings, the first out-coupling grating includes a plurality of arc-shaped stripes disposed in concentric circles and having openings facing the first turn grating, and the second out-coupling grating includes a plurality of arc-shaped stripes disposed in concentric circles and having openings facing the second turn grating. The arc-shaped stripes of the first out-coupling grating partially surround the first turn grating and fill most of a surface of the first lens, and the arc-shaped stripes of the second out-coupling grating partially surround the second turn grating and fill most of a surface of the second lens, which facilitates implementing a large-area eye movement range.

In some embodiments, any one of the in-coupling grating, the first turn grating, the second turn grating, the first out-coupling grating, and the second out-coupling grating is a surface relief grating or a holographic grating. A microstructure of the surface relief grating is convex or concave relative to a surface of the waveguide substrate. The holographic grating may be formed by fitting a holographic grating material to the surface of the waveguide substrate. When types of grating structures of the in-coupling grating, the first turn grating, the second turn grating, the first out-coupling grating, and the second out-coupling grating are consistent (for example, all the grating structures are surface relief gratings or all the grating structures are holographic gratings), this facilitates process implementation and can simplify a manufacturing process when the grating structures are processed on the waveguide substrate.

In some embodiments, any one of the in-coupling grating, the first turn grating, the second turn grating, the first out-coupling grating, and the second out-coupling grating is a vertical grating or an inclined grating. A grating period of any one of the in-coupling grating, the first turn grating, the second turn grating, the first out-coupling grating, and the second out-coupling grating is less than 1 micron. It may be understood that a wavelength selection function can be implemented by optimizing one or more of structural parameters such as a grating height, width, duty cycle, period, and inclination angle that are of any one of the in-coupling grating, the first turn grating, the second turn grating, the first out-coupling grating, and the second out-coupling grating. To be specific, diffraction efficiency of light in a specific wavelength range may be enabled to be high, and diffraction efficiency of light in another wavelength range may be enabled to be low, thereby improving balance of diffraction efficiency of light of a specific wavelength in a range of exit pupil.

In some embodiments, the in-coupling grating, the first turn grating, the second turn grating, the first out-coupling grating, and the second out-coupling grating are all formed on a same side of the waveguide substrate, or formed on different sides of the waveguide substrate. In the in-coupling grating, the first turn grating, the second turn grating, the first out-coupling grating, and the second out-coupling grating, when all the grating structures are located on a same side of the waveguide substrate, this facilitates the process implementation and can simplify the manufacturing process when the grating structures are processed on the waveguide substrate.

In some embodiments, the waveguide substrate is transparent glass or a transparent organic material, and a refractive index of the waveguide substrate ranges from 1.7 to 2.5. The waveguide substrate is transparent, so that the user can clearly see a real image in a real world through the first lens and the second lens. The refractive index of the waveguide substrate ranges from 1.7 to 2.5, so that the incident light meets a total reflection condition and enters the optical waveguide. In some embodiments, the optical waveguide further includes a transparent protective layer, the protective layer covers at least one of the in-coupling grating, the first turn grating, the second turn grating, the first out-coupling grating, and the second out-coupling grating, and a refractive index of the protective layer is less than the refractive index of the waveguide substrate. The refractive index of the protective layer is less than that of the waveguide substrate, so that the incident light meets the total reflection condition and enters the optical waveguide.

In some embodiments, the protective layer is bonded to at least one of the in-coupling grating, the first turn grating, the second turn grating, the first out-coupling grating, and the second out-coupling grating through transparent adhesive. The transparent adhesive has a low refractive index, and the refractive index of the transparent adhesive is less than the refractive index of the waveguide substrate. The refractive index of the transparent adhesive is less than that of the waveguide substrate, so that the incident light meets the total reflection condition and enters the optical waveguide.

In some embodiments, the protective layer is fully fitted to the waveguide substrate through the transparent adhesive. There is no air layer between the protective layer and the waveguide substrate. A manner in which the protective layer and the waveguide substrate are fully fitted facilitates improving impact resistance of the entire optical waveguide. When the optical waveguide falls, the transparent adhesive can absorb a part of impact, and prevent the optical waveguide from breaking due to force. In addition, in the manner in which the protective layer and the waveguide substrate are fully fitted, an air layer existing between the protective layer and the waveguide substrate is omitted, so that the optical waveguide is more artistic, a probability of dust entry is reduced, a picture is more transparent, and a display effect is enhanced.

In some other embodiments, the protective layer is bonded to the waveguide substrate via air bonding through the transparent adhesive, and there is an air layer between the protective layer and the waveguide substrate. A refractive index of the air layer is lower than the refractive index of the waveguide substrate, so that the incident light also meets the total reflection condition and enters the optical waveguide.

In some embodiments, the first turn grating and the second turn grating are axisymmetric about a center line of the optical waveguide in the direction of the Y-axis; and the first out-coupling grating and the second out-coupling grating are axisymmetric about the center line of the optical waveguide in the direction of the Y-axis. In this case, the optical waveguide is left-right symmetrical along the direction of the X-axis, so that propagation paths of the first diffractive light and the second diffractive light before reaching the human eyes are symmetrical. Therefore, symmetrical expansion of a field of view can be implemented, to provide good balance and enable image effects seen by both eyes of the user to be consistent.

According to a second aspect, this application provides a near-eye display device, including:
a display; and
the optical waveguide according to the first aspect, where
the display is disposed corresponding to the connecting portion;
when a user wears the near-eye display device, the first lens and the second lens respectively correspond to the left eye and the right eye of the user, and the optical waveguide is closer to the bridge of the nose of the user than the display; and after light emitted from the display is vertically incident on the in-coupling grating, the first diffractive light and the second diffractive light are formed through diffraction.

In the optical waveguide included in the near-eye display device, the in-coupling grating can bidirectionally propagate the incident light, to implement binocular display by using one display. This reduces a quantity of displays, reduces a weight of the near-eye display device, and improves wearing comfort of the user. Further, production costs can also be reduced due to a reduction in the quantity of displays.

In some embodiments, the display is any one of an organic light-emitting diode display, a micro inorganic light-emitting diode display, a liquid crystal display, a liquid crystal on silicon display, a digital micro-mirror device, and a laser beam scanner.

| Description of reference signs of main elements | |
|---|---|
| Near-eye display devices | 100a and 100b |
| Optical waveguides | 10a and 10b |
| Waveguide substrate | 10 |
| First lens | 11 |
| First turn gratings | 111a and 111b |
| First out-coupling gratings | 112a and 112b |
| First upper sub-grating | 1121 |
| First lower sub-grating | 1122 |
| Second lens | 12 |
| Second turn gratings | 121a and 121b |
| Second out-coupling gratings | 122a and 122b |
| Second upper sub-grating | 1221 |
| Second lower sub-grating | 1222 |
| Connecting portion | 13 |
| In-coupling grating | 131 |
| First angle | θ1 |
| Second angle | θ2 |
| First diffractive light | L1 |
| Second diffractive light | L2 |
| Surface relief grating | 14 |
| Holographic grating | 15 |
| Transparent adhesive | 16 |
| Protective layer | 17 |
| Display | 20 |

DESCRIPTION OF EMBODIMENTS

An augmented reality (Augmented Reality, AR) technology is a technology of combining and interacting a virtual scene on a screen with a real scene in a real world by actualizing a location and an angle of an image through a display (also referred to as an optical machine or a projector), and adding an image analysis technology.

In some embodiments of this application, a near-eye display device may also be an AR display device, to provide augmented reality content for a user, and give the user brand new interactive experience by combining a virtual world with a real world by using an AR technology. In addition, in the embodiments of this application, the near-eye display device may be configured in a form of glasses (for example, AR glasses), or may be configured in a form of a helmet or goggles, which is not limited herein.

The following clearly and completely describes the technical solutions in embodiments of this application with reference to the accompanying drawings in the embodiments of this application. It is clear that the described embodiments are only some but not all of the embodiments of this application.

Figure 1:
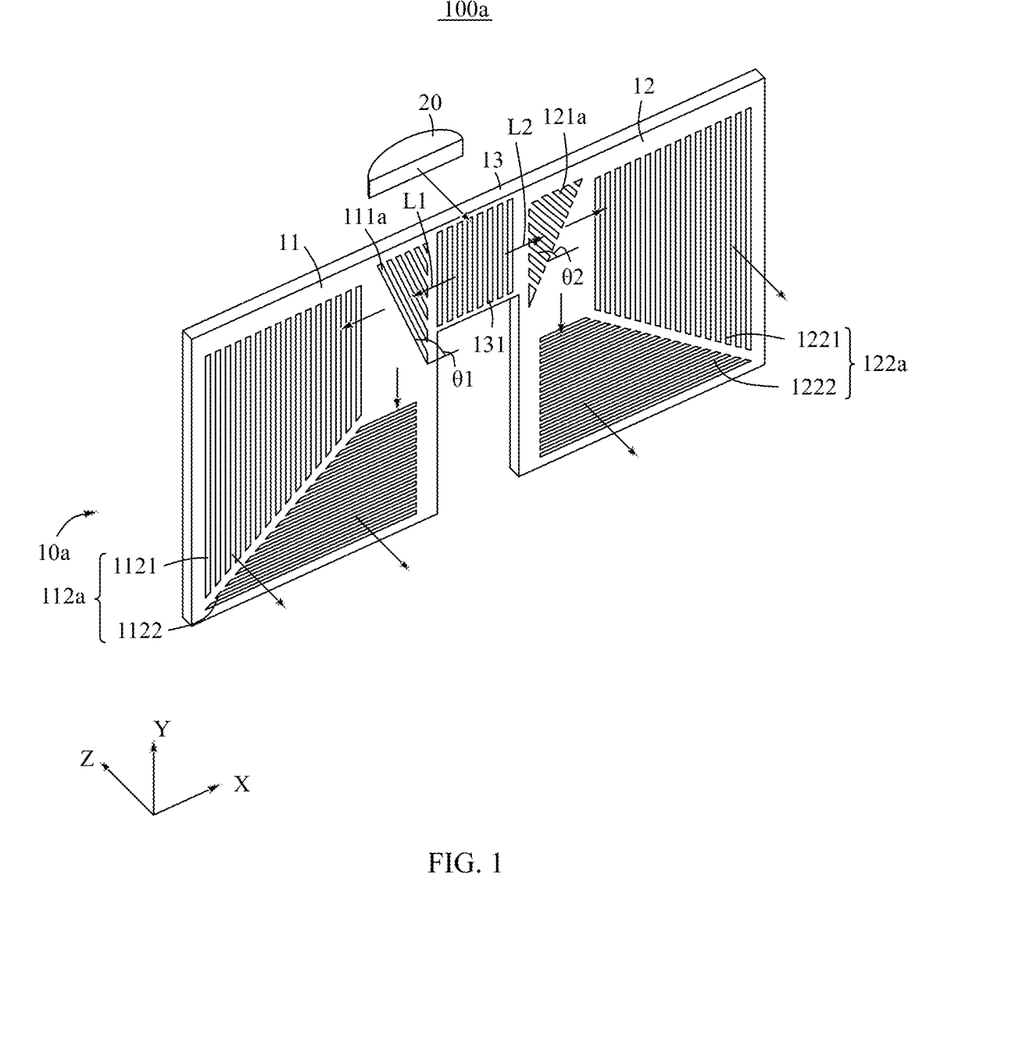
FIG. 1 is a schematic three-dimensional diagram of a near-eye display device according to an embodiment of this application.

FIG. 1 is a schematic three-dimensional diagram of a near-eye display device according to an embodiment of this application. As shown in FIG. 1, a near-eye display device 100a includes a display 20 and an optical waveguide 10a. The optical waveguide 10a includes a first lens 11, a second lens 12, and a connecting portion 13. The first lens 11 and the second lens 12 are located on opposite sides of the connecting portion 13, and are connected by the connecting portion 13. The display 20 corresponds to (faces) the connecting portion 13. In this embodiment, a projection of the display 20 on the optical waveguide 10a falls on the connecting portion 13.

The first lens 11, the second lens 12, and the connecting portion 13 are integrally formed on a same waveguide substrate. Compared with a manner in which the first lens, the second lens, and the connecting portion are separately processed and then connected by using glue or another mechanical structure, integrated molding can simplify a processing process, ensure consistency of optical planes of the first lens, the second lens, and the connecting portion, and increase a production yield.

It may be understood that when the near-eye display device 100a is configured in a form of glasses (for example, AR glasses), the near-eye display device 100a may further include structures such as a glasses frame (not shown in the figure) and temples (not shown in the figure) connected to two sides of the glasses frame. The optical waveguide 10a and the display 20 may be disposed on the glasses frame. The temples are convenient for a user to wear the near-eye display device 100a in front of the face through fixing by the ears. The structures such as the glasses frame and the temple may be conventional structures of the glasses. For example, materials of the structures such as the glasses frame and the temple may be metal, plastic, carbon fiber, or the like. In addition, to reduce a weight of the near-eye display device, the structures such as the glasses frame and the temple are made of a fiber material of high-strength and high-modulus fiber, which is light in weight, and can avoid a feeling of pressure on the ears caused by wearing the near-eye display device by a user for a long time. In another embodiment, when being configured in a form of a helmet or goggles, the near-eye display device 100a further correspondingly includes a specific structure for the user to wear on the head. Details are not described herein.

The display 20 may be any one of an organic light-emitting diode (Organic Light-Emitting Diode, OLED) display, a micro inorganic light-emitting diode (Micro Light-Emitting Diode, Micro LED) display, a liquid crystal display (Liquid Crystal Display, LCD), a liquid crystal on silicon (Liquid Crystal on Silicon, LCoS) display, a digital micro-mirror device (Digital Micro-mirror Device, DMD), or a laser beam scanner (Laser Beam Scanning, LBS). Light emitted from the display 20 may be visible light, and the light may be light with a single wavelength, or may include light with a plurality of wavebands (for example, red light, blue light, and green light).

Specifically, when the user wears the near-eye display device 100a, the connecting portion 13 corresponds to the bridge of the nose of the user, and the first lens 11 and the second lens 12 respectively correspond to the left eye and the right eye of the user. The optical waveguide 10a is closer to the eye of the user than the display 20. In other words, the optical waveguide 10a is located between the display 20 and the eye of the user. The display 20 is configured to emit light with image information, to provide a virtual image for the first lens 11 and the second lens 12.

In some embodiments, the near-eye display device 100a is an AR display device, the first lens 11 and the second lens 12 are transparent and can directly transmit light in the real world, and the user can clearly see a real image in the real world through the first lens 11 and the second lens 12. When the user wears the near-eye display device 100a, the near-eye display device 100a can overlap the virtual image with the real world, so that the user can see an image combining the real image and the virtual image, to achieve sensory experience beyond reality. For example, when the near-eye display device 100a is an AR display device, the user can experience virtual shopping. When the user wears the near-eye display device 100a, the first lens 11 and the second lens 12 transmit an image in the real world to the eyes of the user, for example, the real world is a store. In this case, the user sees a real image of the store. In addition, the display 20 can provide a virtual image for the first lens 11 and the second lens 12, for example, the virtual image is a commodity or a salesperson. In this case, the first lens 11 and the second lens 12 transmit the virtual image provided by the display 20 to the user, and an image seen by the user is that there is a virtual salesperson sells a commodity in a real store.

Figure 2:
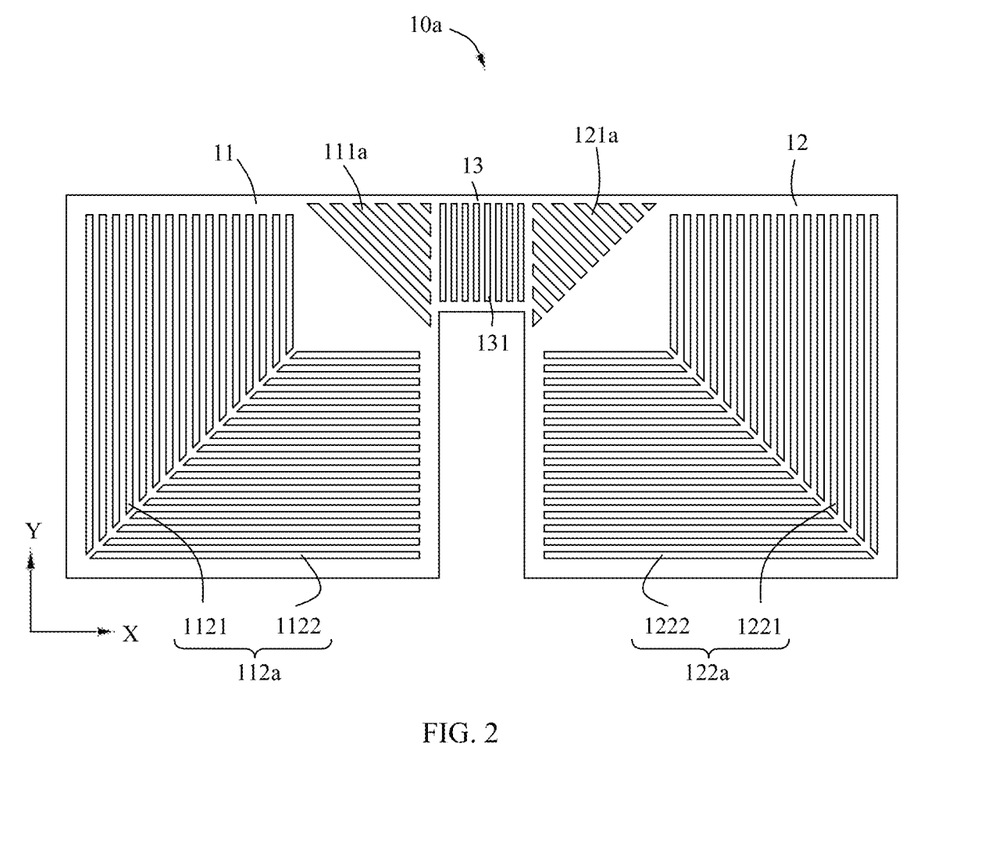
FIG. 2 is a schematic diagram of a plane of an optical waveguide in FIG. 1.

FIG. 2 is a schematic diagram of a plane of the optical waveguide in FIG. 1. The following specifically describes a structure of the optical waveguide 10a in the near-eye display device 100a with reference to FIG. 1 and FIG. 2. For ease of description, a rectangular coordinate system is established by using any point in space as an origin, a thickness direction of the optical waveguide 10a as a direction of a Z-axis, a direction in which the optical waveguide 10a points to the display 20 as a positive direction of the Z-axis, a straight line in which a line connecting a geometric center of the first lens 11 and a geometric center of the second lens 12 is located as a direction of an X-axis, a direction in which the geometric center of the first lens 11 points to the geometric center of the second lens 12 as a positive direction of the X-axis, and a direction perpendicular to both the Z-axis and the X-axis as a direction of a Y-axis. When viewed from a perspective of a viewer facing a surface of the optical waveguide 10a away from the display 20, in the following, a negative direction of the X-axis and the positive direction of the X-axis are also respectively referred to as left and right directions, and a positive direction of the Y-axis and a negative direction of the Y-axis are also respectively referred to as up and down directions. In addition, in the following, the direction of the X-axis is also referred to as a transverse direction, and the direction of the Y-axis is also referred to as a longitudinal direction.

As shown in FIG. 1 and FIG. 2, the optical waveguide 10a further includes an in-coupling grating 131 located on the connecting portion 13, a first turn grating 111a and a first out-coupling grating 112a that are located on the first lens 11, and a second turn grating 121a and a second out-coupling grating 122a that are located on the second lens 12. The in-coupling grating 131 is configured to couple incident light to the optical waveguide 10a. Therefore, a region in which the in-coupling grating 131 on the optical waveguide 10a is located is also referred to as an in-coupling region. The first turn grating 111a is disposed at a location of the first lens 11 close to the in-coupling grating 131, and is located on an optical path between the in-coupling grating 131 and the first out-coupling grating 112a. The first turn grating 111a is configured to perform transverse pupil expansion (in the direction of the X-axis) and longitudinal pupil expansion (in the direction of the Y-axis) on light incident on the first turn grating 111a. The second turn grating 121a is disposed at a location of the second lens 12 close to the in-coupling grating 131, and is located on an optical path between the in-coupling grating 131 and the second out-coupling grating 122a. The second turn grating 121a is configured to perform transverse pupil expansion (in the direction of the X-axis) and longitudinal pupil expansion (in the direction of the Y-axis) on light incident on the second turn grating 121a. Both the first turn grating 111a and the second turn grating 121a are configured to change propagation directions of light, to perform two-dimensional pupil expansion on the light. Therefore, regions in which the first turn grating 111a and the second turn grating 121a on the optical waveguide 10a are located are also referred to as turning regions or pupil expansion regions. The first out-coupling grating 112a partially surrounds the first turn grating 111a, and is configured to couple light out of the optical waveguide 10a. The second out-coupling grating 122a partially surrounds the second turn grating 121a, and is configured to couple light out of the optical waveguide 10a. Because both the first out-coupling grating 112a and the second out-coupling grating 122a are configured to couple light out of the optical waveguide 10a, regions in which the first out-coupling grating 112a and the second out-coupling grating 122a on the optical waveguide 10a are located are also referred to as out-coupling regions. That is, the optical waveguide 10a is approximately divided into three grating regions: the in-coupling region, the turning region (or the pupil expansion region), and the out-coupling region.

Specifically, light that is with image information and that is emitted from the display 20 is vertically irradiated to the connecting portion 13 along the direction of the Z-axis. The in-coupling grating 131 is a one-dimensional diffraction grating. The in-coupling grating 131 includes a plurality of stripes parallel to the Y-axis. Incident light is diffracted by the in-coupling grating 131 to generate diffractive light along two directions of the negative direction of the X-axis and the positive direction of the X-axis. Diffractive light that meets a total reflection condition in the optical waveguide 10a (namely, first diffractive light L1 and second diffractive light L2 in FIG. 1) is totally reflected in the optical waveguide 10a, and is respectively transmitted in the first lens 11 and the second lens 12 almost losslessly. When the first diffractive light L1 in the negative direction of the X-axis encounters the first turn grating 111a, the first turn grating 111a diffracts the incident light (namely, the first diffractive light L1) to the negative direction of the X-axis and the negative direction of the Y-axis because of a diffraction effect of the first turn grating 111a. Two beams of diffractive light in the negative direction of the X-axis and the negative direction of the Y-axis continue to be totally reflected and propagate to the first out-coupling grating 112a in the first lens 11. After being diffracted by the first out-coupling grating 112a, light that does not meet the total reflection condition of the optical waveguide 10a is coupled out of the optical waveguide 10a, enters the left eye of a person, and is perceived.

Similarly, when the second diffractive light L2 in the positive direction of the X-axis encounters the second turn grating 121a, the second turn grating 121a diffracts the incident light to the positive direction of the X-axis and the negative direction of the Y-axis because of a diffraction effect of the second turn grating 121a. Two beams of diffractive light in the positive direction of the X-axis and the negative direction of the Y-axis continue to be totally reflected and propagate to the second out-coupling grating 122a in the second lens 12. After being diffracted by the second out-coupling grating 122a, light that does not meet the total reflection condition of the optical waveguide 10a is coupled out of the optical waveguide 10a, enters the right eye of the person, and is perceived.

Both the first turn grating 111a and the second turn grating 121a are one-dimensional diffraction gratings. The first turn grating 111a includes a plurality of stripes at a first angle θ1 to the X-axis. The second turn grating 121a includes a plurality of stripes at a second angle θ2 to the X-axis. In other words, all the stripes of the first turn grating 111a and the stripes of the second turn grating 121a are at specific angles to the stripes of the in-coupling grating 131. In this way, after light diffracted from the in-coupling grating 131 passes through the first turn grating 111a and the second turn grating 121a, optical paths can be turned, and transverse pupil expansion and longitudinal pupil expansion can be implemented, thereby expanding a range of light transmission in the optical waveguide and increasing a range of an effective eye movement frame.

In some embodiments, the first angle θ1 ranges from 100° to 170° (for example, 100° to 110°, 110° to 120°, 130° to 140°, 140° to 150°, 150° to 160°, or 160° to 170°). The second angle θ2 ranges from 100° to 170° (for example, 100° to 110°, 110° to 120°, 130° to 140°, 140° to 150°, 150° to 160°, or 160° to 170°). When the first angle θ1 is greater than 170° or less than 100°, a turning effect of the first turn grating 111a on the incident light becomes poor, or basically no turning occurs. Therefore, the first angle θ1 ranges from 100° to 170°, so that the first turn grating 111a has a good turning effect on the light incident on the first turn grating 111a. Similarly, when the second angle θ2 is greater than 1700 or less than 100°, a turning effect of the second turn grating 121a on the incident light becomes poor, or basically no turning occurs. Therefore, the second angle θ2 ranges from 100° to 170°, so that the second turn grating 121a has a good turning effect on the light incident on the second turn grating 121a.

In some embodiments, along a direction at an included angle of 45° to the X-axis, the first lens 11 is divided into a first upper out-coupling region (not shown in the figure) approximately located on the upper left of the first lens 11 and a first lower out-coupling region (not shown in the figure) approximately located on the lower right of the first lens 11. The first out-coupling grating 112a includes a first upper sub-grating 1121 and a first lower sub-grating 1122 that are respectively located in the first upper out-coupling region and the first lower out-coupling region. The first upper sub-grating 1121 and a second sub-grating are respectively located on a left side and a lower side of the first turn grating 111a. Both the first upper sub-grating 1121 and the first lower sub-grating 1122 are one-dimensional diffraction gratings. The first upper sub-grating 1121 includes a plurality of stripes parallel to the Y-axis, and the first lower sub-grating 1122 includes a plurality of stripes parallel to the X-axis. In other words, all the stripes of the first upper sub-grating 1121 and the stripes of the first lower sub-grating 1122 are at specific angles to the stripes of the first turn grating 111a. After light that is diffracted by the first turn grating 111a and that propagates along the negative direction of the X-axis is totally reflected and propagates to the first upper out-coupling region in the first lens 11, the light is diffracted by the first upper sub-grating 1121 and then is coupled out of the optical waveguide 10a, and is vertically emitted to the left eye of the person along the negative direction of the Z-axis. After light that is diffracted by the first turn grating 111a and that propagates along the negative direction of the Y-axis is totally reflected and propagates to the first lower out-coupling region in the first lens 11, the light is diffracted by a first upper-lower grating and then is coupled out of the optical waveguide 10a, and is vertically emitted to the left eye of the person along the negative direction of the Z-axis.

Similarly, along a direction at an included angle of 135° to the X-axis, the second lens 12 is divided into a second upper out-coupling region (not shown in the figure) approximately located on the upper right of the second lens 12 and a second lower out-coupling region (not shown in the figure) approximately located on the lower left of the second lens 12. The second out-coupling grating 122a includes a second upper sub-grating 1221 and a second lower sub-grating 1222 that are respectively located in the second upper out-coupling region and the second lower out-coupling region. The second upper sub-grating 1221 and the second lower sub-grating 1222 are respectively located on a right side and a lower side of the second turn grating 121a. Both the second upper sub-grating 1221 and the second lower sub-grating 1222 are one-dimensional diffraction gratings. The second upper sub-grating 1221 includes a plurality of stripes parallel to the Y-axis, and the second lower sub-grating 1222 includes a plurality of stripes parallel to the X-axis. In other words, all the stripes of the second upper sub-grating 1221 and the stripes of the second lower sub-grating 1222 are at specific angles to the stripes of the second turn grating 121a. After light that is diffracted by the second turn grating 121a and that propagates along the positive direction of the X-axis is totally reflected and propagates to the second upper out-coupling region in the second lens 12, the light is diffracted by the second upper sub-grating 1221 and then is coupled out of the optical waveguide 10a, and is vertically emitted to the right eye of the person along the negative direction of the Z-axis. After light that is diffracted by the second turn grating 121a and that propagates along the negative direction of the Y-axis is totally reflected and propagates to the second lower out-coupling region in the second lens 12, the light is diffracted by the second lower sub-grating 1222 and then is coupled out of the optical waveguide 10a, and is vertically emitted to the right eye of the person along the negative direction of the Z-axis.

As shown in FIG. 1, the first lens 11, the second lens 12, and the connecting portion 13 are all approximately in a rectangular plate shape. The in-coupling grating 131 approximately covers the entire surface of the connecting portion 13, so that most of the light incident on the connecting portion 13 is coupled to the optical waveguide 10a. In another embodiment, shapes of the first lens 11, the second lens 12, and the connecting portion 13 are not limited to a rectangular plate shape. For example, the first lens 11 and the second lens 12 may alternatively be a circle, an oval, or the like.

In some embodiments, the first turn grating 111a and the second turn grating 121a are axisymmetric about a center line of the optical waveguide 10a in the direction of the Y-axis, and the first out-coupling grating 112a and the second out-coupling grating 122a are axisymmetric about the center line of the optical waveguide 10a in the direction of the Y-axis. In this case, the optical waveguide 10a is left-right symmetrical along the direction of the X-axis, so that propagation paths of the first diffractive light L1 and the second diffractive light L2 before reaching the human eyes are symmetrical. Therefore, symmetrical expansion of a field of view can be implemented, to provide good balance and enable image effects seen by both eyes of the user to be consistent.

As shown in FIG. 2, a shape of an outermost edge of a projection of the first turn grating 111a on the first lens 11 is a right triangle, one cathetus of the right triangle is closely adjacent to the in-coupling grating 131, a length of the cathetus is slightly greater than a length of the stripe of the in-coupling grating 131, and a hypotenuse of the right triangle faces the first out-coupling grating 112a. In this way, light diffracted from the in-coupling grating 131 is maximally transmitted to the first turn grating 111a, and light diffracted from the first turn grating 111a is maximally transmitted to the human eye through the first out-coupling grating 112a, thereby improving light utilization.

Similarly, a shape of an outermost edge of a projection of the second turn grating 121a on the second lens 12 is a right triangle, one cathetus of the right triangle is closely adjacent to the in-coupling grating 131, a length of the cathetus is slightly greater than the length of the stripe of the in-coupling grating 131, and a hypotenuse of the right triangle faces the second out-coupling grating 122a. In this way, light diffracted from the in-coupling grating 131 is maximally transmitted to the second turn grating 121a, and light diffracted from the second turn grating 121a is maximally transmitted to the human eye through the second out-coupling grating 122a, thereby improving light utilization.

Still referring to FIG. 2, projections of the first upper sub-grating 1121 and the first lower sub-grating 1122 on the first lens 11 are both right trapezoids, and oblique sides of the two right trapezoids are disposed opposite to each other. An upper base of the right trapezoid presented by the first upper sub-grating 1121 corresponds to the first turn grating 111a, and a lower base corresponds to a left side edge of the first lens 11, and is approximately equal in length to the left side edge of the first lens 11. An upper base of the right trapezoid presented by the first lower sub-grating 1122 corresponds to the first turn grating 111a, and a lower base corresponds to a lower side edge of the first lens 11, and is approximately equal in length to the lower side edge of the first lens 11. Each stripe of the first upper sub-grating 1121 extends from one cathetus (namely, an upper side edge) of the first lens 11 along the direction of the Y-axis to a junction of the first upper out-coupling region and the first lower out-coupling region. The first lower sub-grating 1122 extends from another cathetus (namely, a right side edge) of the first lens 11 along the direction of the X-axis to the junction of the first upper out-coupling region and the first lower out-coupling region. The first upper sub-grating 1121 and the first lower sub-grating 1122 surround the first turn grating 111a, and fill most of a surface of the first lens 11, to implement a large-area eye movement range.

Similarly, projections of the second upper sub-grating 1221 and the second lower sub-grating 1222 on the second lens 12 are both right trapezoids, and oblique sides of the two right trapezoids are disposed opposite to each other. An upper base of the right trapezoid presented the second upper sub-grating 1221 corresponds to the second turn grating 121a, and a lower base corresponds to a right side edge of the second lens 12, and is approximately equal in length to the right side edge of the second lens 12. An upper base of the right trapezoid presented by the second lower sub-grating 1222 corresponds to the second turn grating 121a, and a lower base corresponds to a lower side edge of the second lens 12, and is approximately equal in length to the lower side edge of the second lens 12. Each stripe of the second upper sub-grating 1221 extends from one cathetus (namely, an upper side edge) of the second lens 12 along the direction of the Y-axis to a junction of the second upper out-coupling region and the second lower out-coupling region. The second lower sub-grating 1222 extends from another cathetus (namely, a left side edge) of the second lens 12 along the direction of the X-axis to the junction of the second upper out-coupling region and the second lower out-coupling region. The second upper sub-grating 1221 and the second lower sub-grating 1222 surround the second turn grating 121a, and fill most of a surface of the second lens 12, to implement a large-area eye movement range.

In some embodiments, each of the in-coupling grating 131, the first turn grating 111a, the second turn grating 121a, the first out-coupling grating 112a, and the second out-coupling grating 122a has stripes with a constant pitch and a constant period. In another embodiment, one or more of the in-coupling grating, the first turn grating, the second turn grating, the first out-coupling grating, and the second out-coupling grating may have a constant pitch and varying periods, so that a given wavelength maintains high diffraction efficiency at a specific incident angle, thereby avoiding undesired losses of optical efficiency and an undesired change of brightness in the optical waveguide.

It may be understood that the near-eye display device 100a further includes a control circuit (not shown in the figure). The control circuit includes, for example, a processor and an internal memory coupled to the processor. The processor is configured to control operations of the near-eye display device 100a (for example, an image presentation operation of generating image content displayed to the user or operations of using and controlling a signal adjustment element). The internal memory is configured to store one or more computer programs. The one or more computer programs are configured to be executed by the processor.

In the optical waveguide 10a included in the near-eye display device 100a, the in-coupling grating 131 can bidirectionally propagate the incident light, to implement binocular display by using one display. This reduces a quantity of displays, reduces a weight of the near-eye display device, and improves wearing comfort of the user. Further, production costs can also be reduced due to a reduction in the quantity of displays.

In addition, in the conventional technology, the near-eye display device (for example, AR glasses) usually has two displays, and the two displays are disposed on two sides (for example, two temples) of the glasses, which can further cause wearing discomfort to the user. However, when the near-eye display device 100a in this embodiment of this application is configured in a form of glasses, the display 20 is located on the connecting portion 13 between the two lenses, instead of on temples on two sides, which can avoid a feeling of pressure on the ears caused by wearing the near-eye display device by the user for a long time.

It should be noted that, in another variant, the optical waveguide included in the near-eye display device may omit the first turn grating and the second turn grating. That is, after light emitted from the display is coupled to the optical waveguide, and the incident light is diffracted through the in-coupling grating, the first diffractive light transmitted in the first lens and the second diffractive light transmitted in the second lens are formed. Further, the first diffractive light and the second diffractive light are directly coupled out of the first lens and the second lens through the first out-coupling grating and the second out-coupling grating, and then enter the human eyes for imaging.

Figure 3:
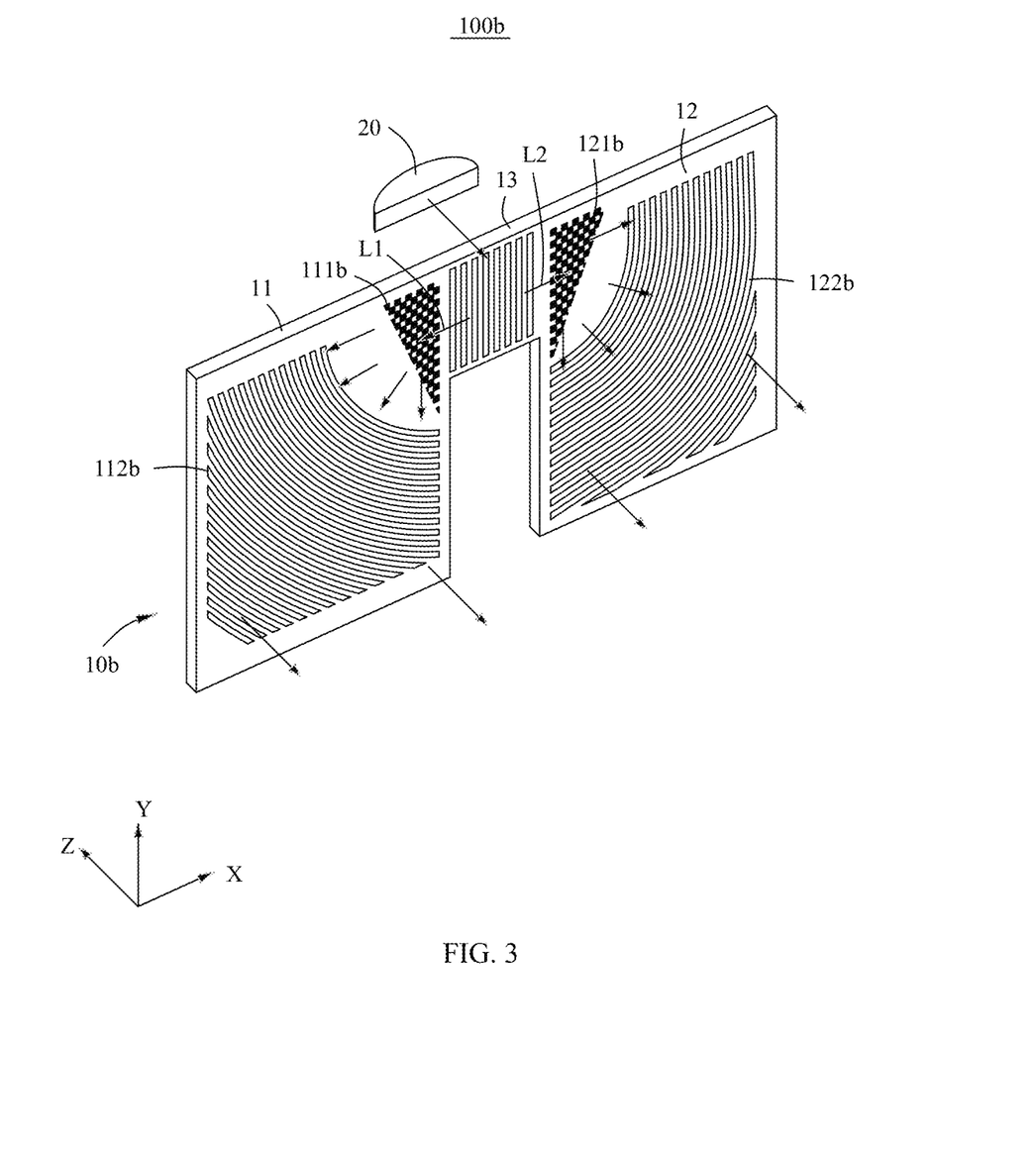
FIG. 3 is a schematic three-dimensional diagram of a near-eye display device according to another embodiment of this application.
Figure 4:
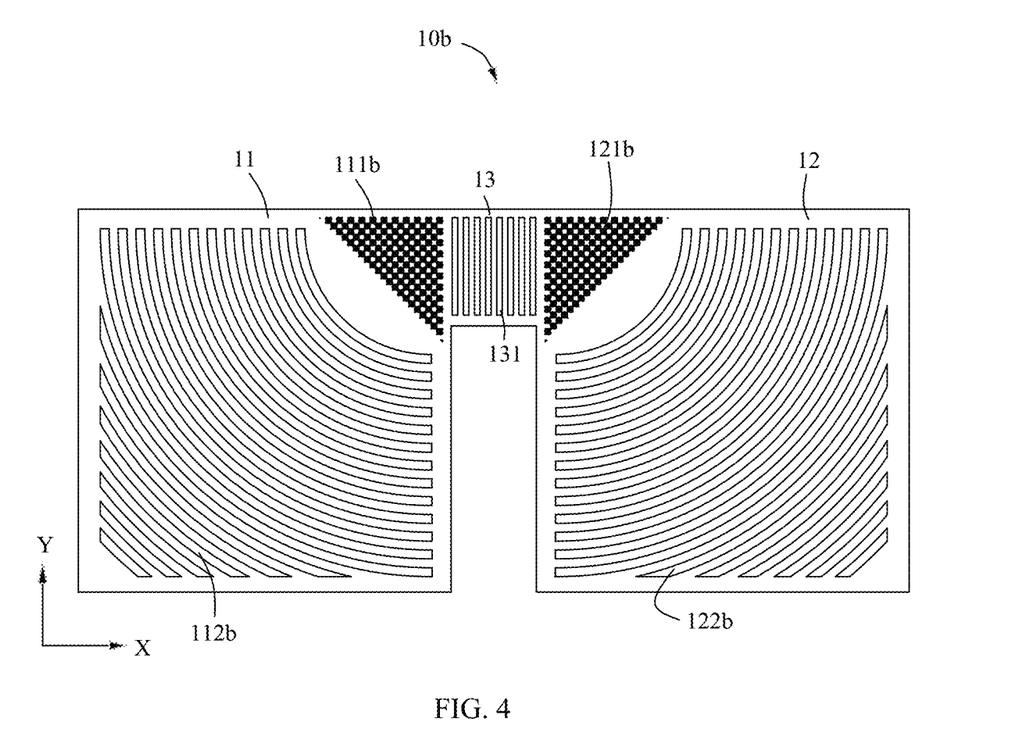
FIG. 4 is a schematic diagram of a plane of an optical waveguide in FIG. 3.

FIG. 3 is a schematic three-dimensional diagram of a near-eye display device according to another embodiment of this application. FIG. 4 is a schematic diagram of a plane of an optical waveguide in FIG. 3. As shown in FIG. 1 and FIG. 3, a difference between a near-eye display device 100b and the near-eye display device 100a lies in that types and arrangements of the first turn grating, the second turn grating, the first out-coupling grating, and the second out-coupling grating are different.

In the near-eye display device 100b, both a first turn grating 111b and a second turn grating 121b are two-dimensional diffraction gratings. Both the first turn grating 111b and the second turn grating 121b are formed by intersections of one-dimensional gratings parallel to the direction of the X-axis and parallel to the direction of the Y-axis. After the first diffractive light L1 propagating to an optical waveguide 10b irradiates a surface of the first turn grating 111b, the first turn grating 111b evenly diffracts the incident light to a region of the third quadrant formed by the negative direction of the X-axis and the negative direction of the Y-axis. The diffractive light continues to be totally reflected and propagate to a first out-coupling grating 112b in the first lens 11, is diffracted by the first out-coupling grating 112b and then is coupled out of the optical waveguide 10b, and further is vertically emitted to the left eye of the person along the negative direction of the Z-axis. The first out-coupling grating 112b is an arc-shaped one-dimensional diffraction grating. The first out-coupling grating 112b includes a plurality of arc-shaped stripes disposed in concentric circles and having openings facing the first turn grating 111b. The plurality of arc-shaped stripes extend from one cathetus (namely, an upper side edge or a left side edge) of the first lens 11 to another cathetus (namely, a right side edge or a lower side edge) of the first lens 11. The arc-shaped stripes partially surround the first turn grating 111b, and fill most of a surface of the first lens 11, to implement a large-area eye movement range.

Similarly, after the second diffractive light L2 propagating to the optical waveguide 10b irradiates a surface of the second turn grating 121b, the second turn grating 121b evenly diffracts the incident light to a region of the fourth quadrant formed by the positive direction of the X-axis and the negative direction of the Y-axis. The diffractive light continues to be totally reflected and propagate to a second out-coupling grating 122b in the second lens 12, is diffracted by the second out-coupling grating 122b and then is coupled out of the optical waveguide 10b, and further is vertically emitted to the right eye of the person along the negative direction of the Z-axis. The second out-coupling grating 122b is an arc-shaped one-dimensional diffraction grating. The second out-coupling grating 122b includes a plurality of arc-shaped stripes disposed in concentric circles and having openings facing the second turn grating 121b. The plurality of arc-shaped stripes extend from one cathetus (namely, an upper side edge or a right side edge) of the second lens 12 to another cathetus (namely, a left side edge or a lower side edge) of the second lens 12. The arc-shaped stripes partially surround the second turn grating 121b, and fill most of a surface of the second lens 12, to implement a large-area eye movement range.

In the optical waveguide 10b included in the near-eye display device 100b, the in-coupling grating 131 can bidirectionally propagate the incident light, to implement binocular display by using one display. This reduces a quantity of displays, reduces a weight of the near-eye display device 100b, and improves wearing comfort of the user. Further, production costs can also be reduced due to a reduction in the quantity of displays.

In some embodiments, a grating period of any one of the in-coupling grating 131, the first turn grating 111a (or the first turn grating 111b), the second turn grating 121a (or the second turn grating 121b), the first out-coupling grating 112a (or the first out-coupling grating 112b), and the second out-coupling grating 122a (or the second out-coupling grating 122b) is less than 1 micron, for example, the grating period is between 100 nanometers and 800 nanometers.

In some embodiments, any one of the in-coupling grating 131, the first turn grating 111a (or the first turn grating 111b), the second turn grating 121a (or the second turn grating 121b), the first out-coupling grating 112a (or the first out-coupling grating 112b), and the second out-coupling grating 122a (or the second out-coupling grating 122b) is a surface relief grating or a holographic grating. The surface relief grating may be a vertical grating or an inclined grating, and the holographic grating may be a vertical grating or an inclined grating.

In some embodiments, the in-coupling grating 131, the first turn grating 111a (or the first turn grating 111b), the second turn grating 121a (or the second turn grating 121b), the first out-coupling grating 112a (or the first out-coupling grating 112b), and the second out-coupling grating 122a (or the second out-coupling grating 122b) may be all formed on a same side of a waveguide substrate (for example, after the optical waveguide and the display are assembled, the foregoing grating structures are located on a side of the waveguide substrate close to the display, or the foregoing grating structures are located on a side of the waveguide substrate away from the display), to facilitate processing; or may be randomly formed on different sides of the waveguide substrate (for example, after the optical waveguide and the display are assembled, in the foregoing grating structures, some grating structures are located on a side of the waveguide substrate close to the display, and some grating structures are located on a side of the waveguide substrate away from the display).

In some embodiments, the waveguide substrate is transparent glass or a transparent organic material, so that the user can clearly see a real image in a real world through the first lens 11 and the second lens 12. The waveguide substrate has a high refractive index, and the refractive index of the waveguide substrate ranges from 1.7 to 2.5 (for example, 1.7 to 1.8, 1.9 to 2.0, 2.0 to 2.1, 2.1 to 2.2, 2.2 to 2.3, 2.3 to 2.4, or 2.4 to 2.5), so that the incident light meets the total reflection condition and enters the optical waveguide.

In some embodiments, the optical waveguide 10a (or the optical waveguide 10b) further includes a transparent protective layer. In the optical waveguide 10a, the protective layer covers at least one of the in-coupling grating 131, the first turn grating 111a, the second turn grating 121a, the first out-coupling grating 112a, and the second out-coupling grating 122a. In the optical waveguide 10b, the protective layer covers at least one of the in-coupling grating 131, the first turn grating 111b, the second turn grating 121b, the first out-coupling grating 112b, and the second out-coupling grating 122b. The protective layer has high strength, and a refractive index of the protective layer is less than the refractive index of the waveguide substrate. A material of the protective layer is, for example, high-strength glass or organic matter, and the organic matter is, for example, polymethyl methacrylate (Polymethyl Methacrylate, PMMA), polycarbonate (Polycarbonate, PC), or acrylic.

In some embodiments, the protective layer is bonded to at least one of the in-coupling grating 131, the first turn grating 11a (or the first turn grating 111b), the second turn grating 121a (or the second turn grating 121b), the first out-coupling grating 112a (or the first out-coupling grating 112b), and the second out-coupling grating 122a (or the second out-coupling grating 122b) through transparent adhesive. The transparent adhesive has a low refractive index, and the refractive index of the transparent adhesive is less than the refractive index of the waveguide substrate. The refractive index of the protective layer and the refractive index of the transparent adhesive are both less than that of the waveguide substrate, so that the incident light meets the total reflection condition and enters the optical waveguide 10*a* (or the optical waveguide 10*b*). The protective layer may be bonded to the waveguide substrate over the entire surface through the transparent adhesive, and there is no air layer between the protective layer and the waveguide substrate (which is also referred to as a full fitting manner). The protective layer covers the grating structures on the waveguide substrate. A manner in which the protective layer and the waveguide substrate are fully fitted facilitates improving impact resistance of the entire optical waveguide. When the optical waveguide falls, the transparent adhesive can absorb a part of impact, and prevent the optical waveguide from breaking due to force. In addition, in the manner in which the protective layer and the waveguide substrate are fully fitted, an air layer existing between the protective layer and the waveguide substrate is omitted, so that the optical waveguide is more artistic, a probability of dust entry is reduced, a picture is more transparent, and a display effect is enhanced. The protective layer may be further fitted to a periphery of the waveguide substrate through the transparent adhesive (for example, transparent frame adhesive) (that is, in a non-full fitting manner, or referred to as a frame bonding manner), and a central region between the protective layer and the waveguide substrate is an air layer. A refractive index of the air layer is lower than the refractive index of the waveguide substrate, so that the incident light also meets the total reflection condition and enters the optical waveguide.

It may be understood that a wavelength selection function can be implemented by optimizing one or more of structural parameters such as a grating height, width, duty cycle, period, and inclination angle that are of any one of the in-coupling grating 131, the first turn grating 111*a* (or the first turn grating 111*b*), the second turn grating 121*a* (or the second turn grating 121*b*), the first out-coupling grating 112*a* (or the first out-coupling grating 112*b*), and the second out-coupling grating 122*a* (or the second out-coupling grating 122*b*). To be specific, diffraction efficiency of light in a specific wavelength range is enabled to be high, and diffraction efficiency of light in another wavelength range is enabled to be low, thereby improving balance of diffraction efficiency of light of a specific wavelength in a range of exit pupil.

Figure 5:
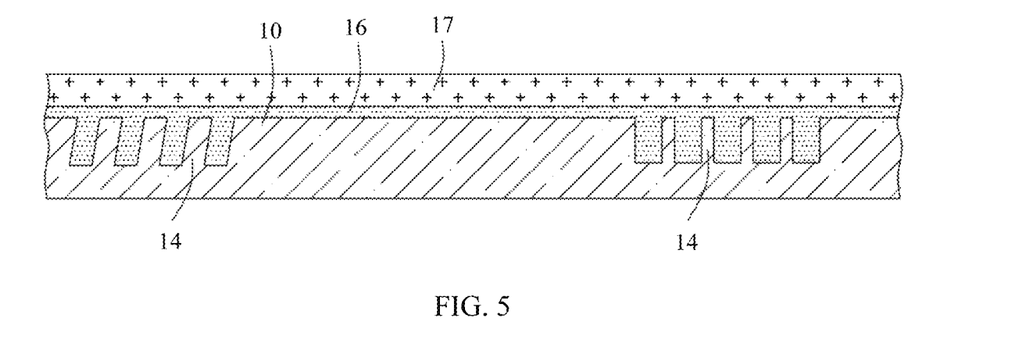
FIG. 5 is a schematic diagram of a partial cross section of an optical waveguide according to an embodiment of this application.

FIG. 5 to FIG. 8 are respectively schematic diagrams of partial cross sections of an optical waveguide according to different embodiments of this application. In FIG. 5, surface relief gratings 14 are processed on a surface of a same side of a same waveguide substrate 10. A microstructure of the surface relief grating 14 is convex or concave relative to the surface of the waveguide substrate 10. The surface relief grating 14 on the left is an inclined grating, and the surface relief grating 14 on the right is a vertical grating. Transparent adhesive 16 fills a concave formed on the surface of the waveguide substrate 10, and bonds a protective layer 17 and the waveguide substrate 10. The protective layer 17 is configured to prevent a grating structure from external damage. The protective layer may be further fitted to a periphery of the waveguide substrate through transparent frame glue, and a central region between the protective layer and the waveguide substrate is an air layer. It may be understood that in the optical waveguide 10*a*, two of the in-coupling grating 131, the first turn grating 111*a*, the second turn grating 121*a*, the first out-coupling grating 112*a*, and the second out-coupling grating 122*a* may be two surface relief gratings 14 in FIG. 5. In the optical waveguide 10*a*, two of the in-coupling grating 131, the first turn grating 111*b*, the second turn grating 121*b*, the first out-coupling grating 112*b*, and the second out-coupling grating 122*b* may be the two surface relief gratings 14 in FIG. 5.

Figure 6:
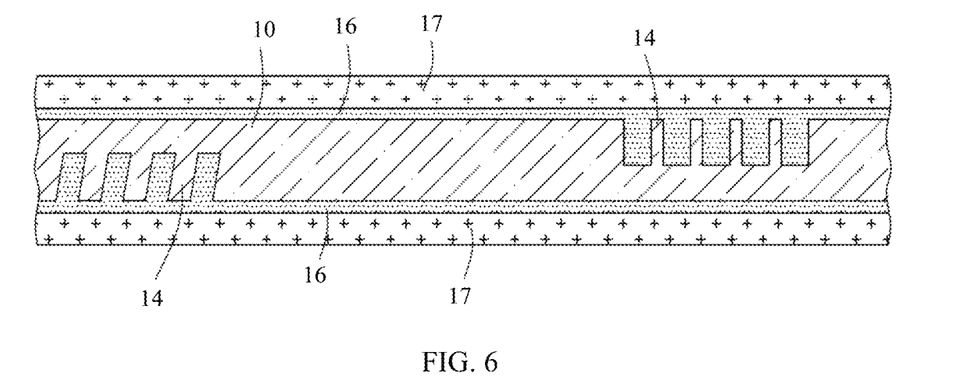
FIG. 6 is a schematic diagram of a partial cross section of an optical waveguide according to another embodiment of this application.

In FIG. 6, surface relief gratings 14 are respectively processed on surfaces of different sides of a same waveguide substrate 10. A microstructure of the surface relief grating 14 is convex or concave relative to the surface of the waveguide substrate 10. The surface relief grating 14 on the left is an inclined grating, and the surface relief grating 14 on the right is a vertical grating. Protective layers 17 are respectively disposed on the different sides of the waveguide substrate 10. Transparent adhesive 16 fills a concave formed on the surface of the waveguide substrate 10, to bond the protective layer 17 and the waveguide substrate 10. The protective layer 17 is configured to prevent a grating structure from external damage. It may be understood that in the optical waveguide 10*a*, two of the in-coupling grating 131, the first turn grating 111*a*, the second turn grating 121*a*, the first out-coupling grating 112*a*, and the second out-coupling grating 122*a* may be two surface relief gratings 14 in FIG. 6. In the optical waveguide 10*a*, two of the in-coupling grating 131, the first turn grating 111*b*, the second turn grating 121*b*, the first out-coupling grating 112*b*, and the second out-coupling grating 122*b* may be the two surface relief gratings 14 in FIG. 6.

Figure 7:
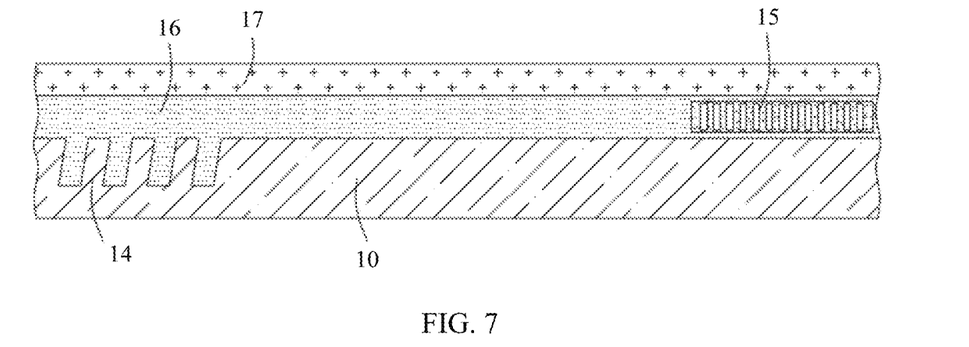
FIG. 7 is a schematic diagram of a partial cross section of an optical waveguide according to still another embodiment of this application.

In FIG. 7, a surface relief grating 14 and a holographic grating 15 are separately disposed on a surface of a same side of a same waveguide substrate 10. A microstructure of the surface relief grating 14 is convex or concave relative to the surface of the waveguide substrate 10. The holographic grating 15 may be formed by fitting a holographic grating material 15 to the surface of the waveguide substrate 10. Similarly, a protective layer 17 is disposed on a side of the holographic grating 15 and the surface relief grating 14 away from the waveguide substrate 10. The protective layer 17 is bonded through transparent adhesive 16, to prevent the holographic grating 15 and the surface relief grating 14 from external damage. Specifically, the holographic grating material may be a photopolymer (Photopolymer) and a liquid crystal (Liquid Crystal) or a mixture of the two. In a manufacturing process, a layer of holographic grating material may be first coated on a glass substrate, and then a film is exposed by using interference stripes generated by two laser beams. Bright and dark interference stripes cause different exposure characteristics of the material, so that a refractive index difference occurs in the film, that is, a necessary "refractive index period" of a diffraction grating is generated. In other words, a part in which the holographic grating material forms stripes has one refractive index, and a part between the stripes has another refractive index, so that an obtained holographic grating has a periodic refractive index change. It may be understood that in the optical waveguide 10*a*, two of the in-coupling grating 131, the first turn grating 111*a*, the second turn grating 121*a*, the first out-coupling grating 112*a*, and the second out-coupling grating 122*a* may be the surface relief grating 14 and the holographic grating 15 in FIG. 7. In the optical waveguide 10*a*, two of the in-coupling grating 131, the first turn grating 111*b*, the second turn grating 121*b*, the first out-coupling grating 112*b*, and the second out-coupling grating 122*b* may be the surface relief grating 14 and the holographic grating 15 in FIG. 7.

Figure 8:
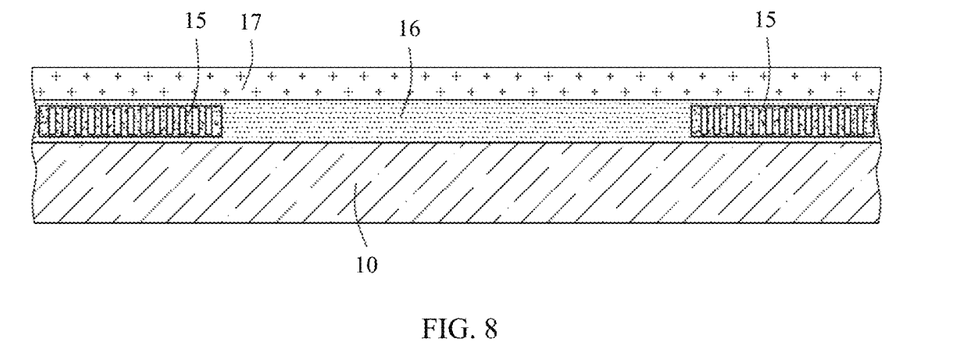
FIG. 8 is a schematic diagram of a partial cross section of an optical waveguide according to yet another embodiment of this application.

In FIG. 8, only holographic gratings 15 are on a surface of a same side of a same waveguide substrate 10. The holographic grating 15 may be formed by fitting a holographic grating material 15 to the surface of the waveguide substrate 10. A protective layer 17 is disposed on a side of the holographic gratings 15 away from the waveguide substrate 10. The protective layer 17 is bonded through transparent adhesive 16, to prevent the holographic gratings 15 and the surface relief grating 14 from external damage. It may be understood that in the optical waveguide 10a, two of the in-coupling grating 131, the first turn grating 111a, the second turn grating 121a, the first out-coupling grating 112a, and the second out-coupling grating 122a may be two holographic gratings 15 in FIG. 8. In the optical waveguide 10a, two of the in-coupling grating 131, the first turn grating 111b, the second turn grating 121b, the first out-coupling grating 112b, and the second out-coupling grating 122b may be the two holographic gratings 15 in FIG. 8.

It may be understood that arrangements of the in-coupling grating 131, the first turn grating 111a (or the first turn grating 111b), the second turn grating 121a (or the second turn grating 121b), the first out-coupling grating 112a (or the first out-coupling grating 112b), and the second out-coupling grating 122a (or the second out-coupling grating 122b) are not limited to manners shown in FIG. 5 to FIG. 8, and further have other variants.

In addition, in the optical waveguide, when types of all grating structures of the in-coupling grating, the first turn grating, the second turn grating, the first out-coupling grating, and the second out-coupling grating are consistent (for example, all the grating structures are surface relief gratings or all the grating structures are holographic gratings), and all the grating structures are located on a same side of the waveguide substrate, this facilitates process implementation and can simplify the manufacturing process when the grating structures are processed on the waveguide substrate.

In conclusion, according to the near-eye display device in the embodiments of this application, the optical waveguide included in the near-eye display device can bidirectionally propagate the incident light, so that binocular display can be implemented by using one display. Compared with a solution in which two displays are disposed, this reduces a quantity of displays, reduces a weight of the near-eye display device, and improves wearing comfort of the user.

The foregoing implementations are merely intended to describe the technical solutions of this application, but not intended to constitute any limitation. Although this application is described in detail with reference to the foregoing preferred implementations, a person of ordinary skill in the art should understand that modifications or equivalent replacements can be made to the technical solutions of this application, without departing from the spirit and scope of the technical solutions of this application.

What is claimed is:

1. An optical waveguide, comprising:
a first lens, a second lens, and a connecting portion that connects the first lens and the second lens;
an in-coupling grating, located on the connecting portion and configured to couple incident light to the optical waveguide, wherein after the incident light is diffracted by the in-coupling grating, first diffractive light transmitted in the first lens and second diffractive light transmitted in the second lens are formed;
a first out-coupling grating, located on the first lens and configured to couple the first diffractive light out of the first lens;
a second out-coupling grating, located on the second lens and configured to couple the second diffractive light out of the second lens;
a first turn grating, located on the first lens; and
a second turn grating, located on the second lens, wherein
a shape of an outermost edge of a projection of the first turn grating is a first right triangle with a first hypotenuse facing the first out-coupling grating; and
a shape of an outermost edge of a projection of the second turn grating is a second right triangle with a second hypotenuse facing the second out-coupling grating.

2. The optical waveguide according to claim 1, wherein the first lens, the second lens, and the connecting portion are integrally formed on a same waveguide substrate.

3. The optical waveguide according to claim 1, wherein a thickness direction of the optical waveguide is a direction of a Z-axis, a straight line in which a line connecting geometric centers of the first lens and the second lens is located is a direction of an X-axis, and a direction perpendicular to both the Z-axis and the X-axis is a direction of a Y-axis; and the in-coupling grating is a one-dimensional diffraction grating, and the in-coupling grating comprises a plurality of stripes parallel to the Y-axis.

4. The optical waveguide according to claim 3, wherein:
the first turn grating is configured to expand the first diffractive light, wherein the expanded first diffractive light is transmitted to the first out-coupling grating through the first lens; and
the second turn grating is configured to expand the second diffractive light, wherein the expanded second diffractive light is transmitted to the second out-coupling grating through the second lens.

5. The optical waveguide according to claim 3, wherein both the first turn grating and the second turn grating are one-dimensional diffraction gratings, the first turn grating comprises a plurality of stripes at a first angle to the X-axis, and the second turn grating comprises a plurality of stripes at a second angle to the X-axis.

6. The optical waveguide according to claim 5, wherein the first angle ranges from 100° to 170°, and the second angle ranges from 100° to 170°.

7. The optical waveguide according to claim 3, wherein the first lens is divided into a first upper out-coupling region and a first lower out-coupling region along a direction at an included angle 45° to the X-axis, and the first out-coupling grating comprises a first upper sub-grating and a first lower sub-grating that are respectively located in the first upper out-coupling region and the first lower out-coupling region;
the second lens is divided into a second upper out-coupling region and a second lower out-coupling region along a direction at an included angle 135° to the X-axis, and the second out-coupling grating comprises a second upper sub-grating and a second lower sub-grating that are respectively located in the second upper out-coupling region and the second lower out-coupling region; and
the first upper sub-grating, the first lower sub-grating, the second upper sub-grating, and the second lower sub-grating are all one-dimensional diffraction gratings, the first upper sub-grating and the second upper sub-grating each comprise a plurality of stripes parallel to the Y-axis, and the first lower sub-grating and the second lower sub-grating each comprise a plurality of stripes parallel to the X-axis.

8. The optical waveguide according to claim 7, wherein each of the stripes of the first upper sub-grating extends from an edge of the first lens along the direction of the Y-axis to a junction of the first upper out-coupling region and the first lower out-coupling region, and the first lower sub-grating extends from another edge of the first lens along the direction of the X-axis to the junction of the first upper out-coupling region and the first lower out-coupling region; and each of the stripes of the second upper sub-grating extends from an edge of the second lens along the direction of the Y-axis to a junction of the second upper out-coupling region and the second lower out-coupling region, and the second lower sub-grating extends from another edge of the second lens along the direction of the X-axis to the junction of the second upper out-coupling region and the second lower out-coupling region.

9. The optical waveguide according to claim 1, wherein one cathetus of the first right triangle is closely adjacent to the in-coupling grating, and one cathetus of the second right triangle is closely adjacent to the in-coupling grating.

10. The optical waveguide according to claim 1, wherein both the first turn grating and the second turn grating are two-dimensional diffraction gratings.

11. The optical waveguide according to claim 10, wherein both the first out-coupling grating and the second out-coupling grating are one-dimensional diffraction gratings, the first out-coupling grating comprises a plurality of arc-shaped stripes disposed in concentric circles and having openings facing the first turn grating, and the second out-coupling grating comprises a plurality of arc-shaped stripes disposed in concentric circles and having openings facing the second turn grating.

12. The optical waveguide according to claim 1, wherein any one of the in-coupling grating, the first turn grating, the second turn grating, the first out-coupling grating, and the second out-coupling grating is a surface relief grating or a holographic grating.

13. The optical waveguide according to claim 1, wherein any one of the in-coupling grating, the first turn grating, the second turn grating, the first out-coupling grating, and the second out-coupling grating is a vertical grating or an inclined grating.

14. The optical waveguide according to claim 1, wherein a grating period of any one of the in-coupling grating, the first turn grating, the second turn grating, the first out-coupling grating, and the second out-coupling grating is less than 1 micron.

15. The optical waveguide according to claim 1, wherein the in-coupling grating, the first turn grating, the second turn grating, the first out-coupling grating, and the second out-coupling grating are all formed on a same side of a waveguide substrate, or formed on different sides of the waveguide substrate.

16. The optical waveguide according to claim 1, wherein a waveguide substrate is transparent glass or a transparent organic material, and a refractive index of the waveguide substrate ranges from 1.7 to 2.5.

17. The optical waveguide according to claim 1, wherein the optical waveguide further comprises a transparent protective layer, the protective layer covers at least one of the in-coupling grating, the first turn grating, the second turn grating, the first out-coupling grating, and the second out-coupling grating, and a refractive index of the protective layer is less than the refractive index of a waveguide substrate.

18. The optical waveguide according to claim 17, wherein the protective layer is bonded to at least one of the in-coupling grating, the first turn grating, the second turn grating, the first out-coupling grating, and the second out-coupling grating through transparent adhesive.

19. The optical waveguide according to claim 18, wherein the protective layer is fully fitted to the waveguide substrate through the transparent adhesive; or the protective layer is bonded to the waveguide substrate via air bonding through the transparent adhesive, and there is an air layer between the protective layer and the waveguide substrate.

20. A near-eye display device, comprising:
a display; and
the optical waveguide according to claim 1, wherein the display is disposed corresponding to the connecting portion;
when a user wears the near-eye display device, the first lens and the second lens respectively correspond to a left eye and a right eye of the user, and the optical waveguide is closer to a bridge of a nose of the user than the display; and after light emitted from the display is vertically incident on the in-coupling grating, the first diffractive light and the second diffractive light are formed through diffraction.

* * * * *